US010522002B2

(12) United States Patent
Wilkinson

(10) Patent No.: US 10,522,002 B2
(45) Date of Patent: Dec. 31, 2019

(54) SYSTEMS AND METHODS FOR AUTOMATICALLY TRACKING TOKENS DROPPED INTO A DROP BOX

(71) Applicant: Michael Wilkinson, Martinez, CA (US)

(72) Inventor: Michael Wilkinson, Martinez, CA (US)

( * ) Notice: Subject to any disclaimer, the term of this patent is extended or adjusted under 35 U.S.C. 154(b) by 269 days.

(21) Appl. No.: 15/639,945

(22) Filed: Jun. 30, 2017

(65) Prior Publication Data

US 2019/0005768 A1 Jan. 3, 2019

(51) Int. Cl.
| | | |
|---|---|---|
| G07F 17/32 | (2006.01) | |
| G07D 9/00 | (2006.01) | |
| H04N 7/18 | (2006.01) | |
| H04N 5/225 | (2006.01) | |
| G06K 9/78 | (2006.01) | |
| A63F 13/213 | (2014.01) | |
| G07D 11/14 | (2019.01) | |
| G06K 9/46 | (2006.01) | |
| G06K 9/00 | (2006.01) | |
| G06T 7/13 | (2017.01) | |

(52) U.S. Cl.
CPC ........ *G07F 17/3248* (2013.01); *A63F 13/213* (2014.09); *G06K 9/00* (2013.01); *G06K 9/4604* (2013.01); *G06K 9/4652* (2013.01); *G06K 9/78* (2013.01); *G07D 9/00* (2013.01); *G07D 11/14* (2019.01); *H04N 5/2253* (2013.01); *H04N 5/2257* (2013.01); *H04N 7/188* (2013.01); *G06T 7/13* (2017.01); *G06T 2207/30221* (2013.01); *G06T 2207/30232* (2013.01); *G06T 2207/30242* (2013.01)

(58) Field of Classification Search
CPC ................. G07F 1/00; G07F 1/02; G07F 9/08
See application file for complete search history.

(56) References Cited

U.S. PATENT DOCUMENTS

| | | | | |
|---|---|---|---|---|
| 5,873,446 A | * | 2/1999 | Wei ...................... | G07D 11/125 194/350 |
| 6,082,519 A | * | 7/2000 | Martin .................... | G07D 9/00 194/350 |
| 6,129,029 A | * | 10/2000 | Watson ................... | E05B 35/12 109/56 |

(Continued)

FOREIGN PATENT DOCUMENTS

WO    WO 01/20489 A1    3/2001

*Primary Examiner* — Pankaj Kumar
*Assistant Examiner* — Timothy R Newlin
(74) *Attorney, Agent, or Firm* — Vierra Magen Marcus LLP

(57) ABSTRACT

Systems and methods described herein are for use with a gaming table including an opening, below which is located a drop box, and that is covered by a door when the door is in a closed position. A camera is positioned relative to the door to capture an image of tokens resting on the door. A camera trigger detects when the door is being moved from a closed position to an open position, and selectively triggers the camera to capture an image of tokens resting on the door before they drop into the drop box. Processor(s) analyze images, stored in memory, of the tokens resting on the door to determine a value of each of the tokens, calculate a total value of the tokens dropped into the drop box, and attribute to dealers a subtotal of the total value of the tokens dropped into the drop box by the dealer.

23 Claims, 6 Drawing Sheets

(56) References Cited

U.S. PATENT DOCUMENTS

| | | | |
|---|---|---|---|
| 6,199,862 B1* | 3/2001 | Long | G07D 11/0093 232/4 R |
| 6,409,589 B1* | 6/2002 | Laconico, Jr. | G07F 9/06 194/350 |
| 6,517,436 B2 | 2/2003 | Soltys et al. | |
| 6,758,751 B2 | 7/2004 | Soltys et al. | |
| 7,264,150 B1* | 9/2007 | Moreland | E05G 7/001 194/206 |
| 7,491,125 B2 | 2/2009 | Mathis et al. | |
| 8,328,641 B2 | 12/2012 | Bradshaw | |
| 8,520,072 B1* | 8/2013 | Slavin | G08B 13/19684 348/143 |
| 8,723,652 B2 | 5/2014 | Delaney et al. | |
| 8,786,425 B1* | 7/2014 | Hutz | H04M 11/04 340/526 |
| 9,741,050 B2* | 8/2017 | Stepanovich | G06Q 30/0214 |
| 9,761,099 B1* | 9/2017 | Barth | G08B 13/08 |
| 2002/0189917 A1* | 12/2002 | Cole | G07F 9/08 194/215 |
| 2003/0003997 A1* | 1/2003 | Vuong | G07F 17/32 463/42 |
| 2005/0017607 A1* | 1/2005 | Weinberger | A47B 67/04 312/215 |
| 2006/0030404 A1 | 2/2006 | Puhlman | |
| 2007/0072533 A1* | 3/2007 | Haruna | G07D 3/14 453/11 |
| 2008/0113783 A1 | 5/2008 | Czyzewski et al. | |
| 2009/0098932 A1* | 4/2009 | Longway | G07F 17/32 463/22 |
| 2009/0131151 A1* | 5/2009 | Harris | G07F 17/32 463/22 |
| 2011/0186622 A1* | 8/2011 | Nikon | G07F 9/06 232/15 |
| 2012/0208622 A1* | 8/2012 | Delaney | G07F 17/322 463/25 |
| 2013/0202184 A1* | 8/2013 | Grove | G07D 5/00 382/136 |
| 2013/0205723 A1* | 8/2013 | Blake | G07F 9/08 53/473 |
| 2013/0340656 A1* | 12/2013 | Rainier | E05G 1/02 109/38 |
| 2014/0067663 A1* | 3/2014 | Starke | G06Q 20/18 705/39 |
| 2014/0305352 A1* | 10/2014 | Dowling | G07C 9/00031 109/38 |
| 2015/0018083 A1* | 1/2015 | Czyzewski | G07F 17/3204 463/25 |
| 2016/0053526 A1* | 2/2016 | Dittrich | E05G 1/04 109/38 |
| 2016/0328913 A1* | 11/2016 | Blazevic | G07F 17/3211 |
| 2017/0148278 A1* | 5/2017 | Susaki | G07F 19/202 |
| 2017/0236372 A1* | 8/2017 | Bulzacki | G07F 17/32 463/43 |

* cited by examiner

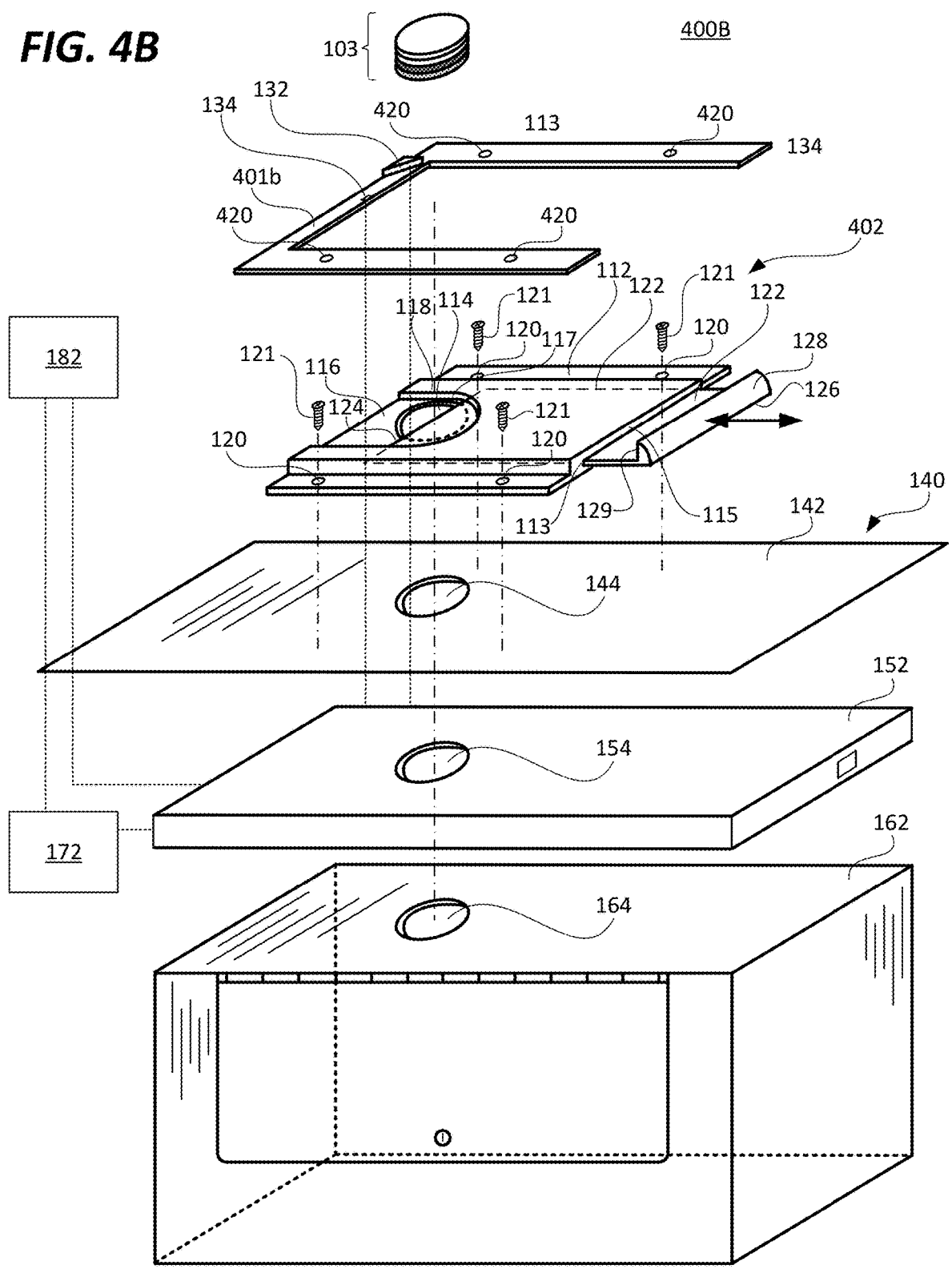

SYSTEMS AND METHODS FOR AUTOMATICALLY TRACKING TOKENS DROPPED INTO A DROP BOX

BACKGROUND

Drop slides are used with gaming tables to deposit tokens, such as poker chips or other gaming tokens, into a drop box. Drop slides are particularly useful on poker tables, where a casino takes a fee from the pot or on other gaming tables where a fee is paid by players for each wager placed. Conventionally, a total value of all the tokens that are dropped via a drop slide into a drop box is unknown until the contents of the drop box are emptied and manually counted by a casino employee. It is possible that a casino employee that is tasked with removing tokens from the drop box and/or tallying the value of the tokens slips some in their pocket or otherwise skims some of the tokens. Likewise, it is unknown how many hands a dealer is dealing until a video recording review can be performed. This process is very time consuming and usually delayed.

SUMMARY

Certain embodiments of the present technology are related to a system for use with a gaming table including an opening below which is located a drop box, wherein the opening in the table is covered by a door when the door is in a closed position and at least a portion of the opening in the table is uncovered when the door is in an open position. In accordance with certain embodiments, the system includes a camera positioned relative to the door so that the camera can capture an image of tokens resting on the door. The system also includes a camera trigger configured to detect when the door is being moved from a closed position to an open position. The camera is selectively triggered to capture an image of tokens resting on the door, before the tokens drop into the drop box, in response to the camera trigger detecting that the door is being moved from the closed position to the open position.

The camera trigger can be, for example, a sensor that is covered by the door when the door is in the closed position and is uncovered when the door is moved from the closed position to the open position. The sensor can be configured to produce a signal that can be used to determine whether or not the sensor is being covered by the door. Such a sensor can be, e.g., an optical proximity sensor, an ambient light sensor, a capacitive sensor, or a magnetic sensor, but is not limited thereto.

In certain embodiments, the camera trigger is a switch that is unactuated when the door is in the closed position and is actuated in response to the door being moved from the closed position to the open position. The switch can be mechanically activated or electrically activated in response to the door being moved from the closed position to the open position.

In accordance with certain embodiments, the system includes a drop slide that includes the door, wherein the door of the drop slide is configured to be slid from the closed position to the open position in response to a translational force being applied to a handle of the door. The camera and the camera trigger can be attached to and/or integrated into the drop slide.

In accordance with certain embodiments, the door is part of a drop slide with which the system can be used but which is separate from the system. In such embodiments, the system can include a substrate configured to be mounted to a table above or below a portion of the drop slide, wherein at least one of the camera or the camera trigger is attached to and/or integrated into the substrate. In certain embodiments, the substrate can be a bracket configured to be mounted to the table such that at least a portion of the bracket is positioned below (or above) at least a portion of the drop slide, wherein at least one of the camera or the camera trigger is attached to and/or integrated into the bracket.

In accordance with certain embodiments, the system includes one or more processors configured to analyze images of tokens resting on the door that are captured by the camera to determine a value of each of the tokens, and calculate a total value of the tokens that are dropped into the drop box. The one or more processors can also be configured to use computer vision to analyze the images of the tokens resting on the door that are captured by the camera to determine the value of each of the tokens. In certain embodiments, the system also includes a user interface communicatively coupled to at least one of the processor(s) and configured to enable dealers to specify when they are dealing at the table. The one or more processors can also be configured to keep track of multiple dealers that deal at the table and attribute to each of the dealers a subtotal of the total value of the tokens dropped into the drop box by the dealer.

Certain embodiments of the present technology are related to methods for use with a gaming table including an opening below which is located a drop box, wherein the opening in the table is covered by a door when the door is in a closed position and at least a portion of the opening in the table is uncovered when the door is in an open position. Such a method can include providing a camera relative to the door so that the camera can capture an image of tokens resting on the door. The method can also include detecting when the door is being moved from a closed position to an open position, and selectively triggered the camera to capture an image of tokens resting on the door, before the tokens drop into the drop box, in response to detecting that the door is being moved from the closed position to the open position.

A method can also include analyzing the images of tokens resting on the door that are captured by the camera to determine a value of each of the tokens, and calculating a total value of the tokens that are dropped into the drop box. The analyzing and the calculating can be performed using one or more processors. The method can further include keeping track of multiple dealers that deal at the table, and attributing to each of the dealers a subtotal of the total value of the tokens dropped into the drop box by the dealer. Keeping track of the dealers that deal at the table can involve identifying each of the dealers based on an identifier accepted by a key pad or read by a card or fob reader, or dropping of a special token that distinguishes between dealers or indicates an exchange of dealers, but is not limited thereto.

In accordance with certain embodiments, the step of detecting when the door is being moved from the closed position to the open position is performed using a sensor. In certain embodiments, the sensor is covered or otherwise blocked by the door when the door is in the closed position and is uncovered or otherwise unblocked when the door is moved from the closed position to the open position. In such embodiments, determining whether or not the sensor is being covered or otherwise blocked by the door can be based on a detection signal produced by the sensor.

In accordance with certain embodiments, the step of detecting when the door is being moved from the closed position to the open position is performed using a switch that is unactuated when the door is in the closed position and is actuated in response to the door being moved from the closed position to the open position. Other ways of detecting when the door is being moved from the closed position to the open position are possible and within the scope of the embodiments described herein.

Other systems and methods of the present technology can be used with other types of apparatuses, besides drop slides, that are used to selectively cause tokens to drop into a drop box. Such other systems and methods can also be used to capture images of tokens before they drop into a drop box, and such images can also be analyzed to determine a value of each of the tokens, calculate a total value of the tokens that are dropped into the drop box, etc.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 4A and 4B illustrate exploded views of systems according to other embodiments of the present technology.

DETAILED DESCRIPTION

Figure 1:
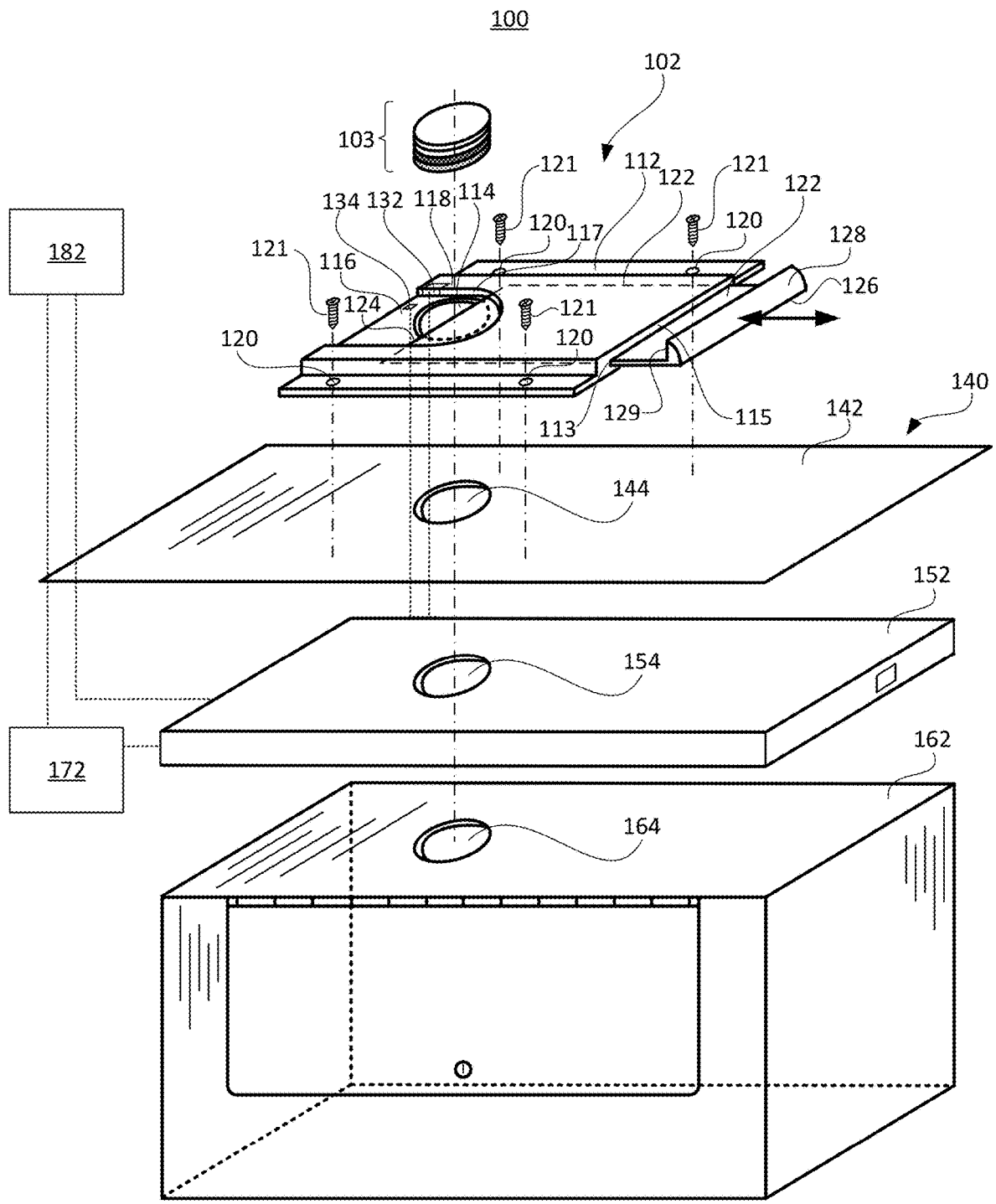
FIG. 1 illustrates an exploded view of a system according to an embodiment of the present technology.

FIG. 1 illustrates a system 100 according to an embodiment of the present technology. The system 100 is shown as including a drop slide 102, a camera 132, a camera trigger 134, an auxiliary unit 152, a computer 172, and a user interface 182. As will be described in additional detail below, the camera trigger 134 can be used to selectively capture images of tokens 103 before the tokens are dropped into a drop box 162 that is below a table 140 to which the drop slide 102 is mounted. As will also be described in additional details below, the computer 172 receives the images of the tokens 103 captured by the camera 132 and determines the quantity of the tokens 103 and the value of the tokens 103 that are dropped into the drop box 162, so that a total value of the tokens 103 contained in the drop box 162 can be automatically determined. Beneficially, the system 100 can automatically determine the total value of the tokens 103 dropped into the drop box without requiring that a dealer modify their behavior. For example, there is no requirement that the dealer must insert one token at a time into a slot, or the like. Rather, the dealer simply needs to place the tokens 103 that are to be deposited in the drop box on a door 122 of the drop slide and then opens the door 122 in a conventional manner, e.g., by sliding the door 122 from its closed position to its open position. Further, the system does not require that any special type of tokens be used, such as tokens that include radio frequency identification (RFID) tags, or the like. This would allow casinos to use the tokens they already currently use. Although, the system would work with tokens that include RFID tags, or the like.

The camera trigger 134 can be in direct wired or wireless communication with the camera 132, to thereby selectively trigger the camera 132 to capture an image of tokens 103 resting on an upper surface of the door 122. Alternatively, the camera trigger 134 and the camera 132 can each be in wired or wireless communication with the auxiliary unit 152, and the camera trigger 134 can indicate to the auxiliary unit 152 when an image is to be captured, and the computer can instruct the camera 132 to capture an image of tokens 103 resting on an upper surface of the door 122. In other words, the auxiliary unit 152 may act as an intermediary for communication between the camera trigger 134 and the camera 132. Either way, the camera trigger 134 can be said to selectively trigger the camera 132 to capture images of tokens, whether the triggering is directly between the camera trigger 134 and the camera 132, or the auxiliary unit 152 acts as an intermediary. The dotted lines between the camera trigger 134 and the camera 132, between the camera trigger 134 and the auxiliary unit 152, and between the camera 132 and the auxiliary unit 152, illustrate exemplary wired or wireless communication pathways between these various components of the system 100. Additional details of the drop slide 102, the camera 132, the camera trigger 134, the auxiliary unit 152, the computer 172, and the user interface 182, according to various embodiments of the present technology, are described below.

Still referring to FIG. 1, the drop slide 102 is used for dropping tokens 103, such as poker or other gaming tokens, into the drop box 162. The drop slide 102 can be used with various types of gaming tables, and is particularly useful on poker tables, where a casino takes a fee from the pot or on other gaming tables where a fee is paid by players for each wager placed. As will be appreciated from the following description, the drop slide 102 is an example of an apparatus that can be used to selectively cause one or more tokens 103 resting on a portion of the apparatus to drop through an opening 144 in a gaming table 140 and into the drop box 162. As shown in FIG. 1, the drop slide 102 has a base 112, which includes an opening 114, and the door 122. The drop slide 102 can also be referred to as the drop slot 114. The base 112 can be mounted to a tabletop 142 of the gaming table 140, over the opening 144 in the tabletop 142, which opening 144 can also be referred to as an opening 144 in the table 140. The base 112 is shown as including a recessed portion 116 that is partially surrounded by a raised portion 118, with a wall 117 extending vertically between an upper surface of the recessed portion 116 and an upper surface of the raised portion 118. In the example shown, the recessed portion 118 has an arch shape, but may have an alternative shape.

When in its closed position, the door 122 allows multiple tokens 103 (which can also be referred to as chips 103) to rest within the recessed portion 116 of the base 112 on an upper surface of the door 122 so that the tokens can be viewed before the door 122 is opened and the tokens resting on the door 122 drop into the drop box 162. More specifically, when the door 122 is moved from its closed position to its opened position, the tokens that were resting on the door 122 drop through the opening 114 in the base 112, through the opening 144 in the tabletop 142, and through an opening 164 in the drop box 162. The wall 117 of the base 112 acts as a stop for the tokens 103, so that the tokens 103 do not slide along with the door 122 as the door is slid from its closed position to its open position. In the embodiment shown, gravity assists with the tokens 103 dropping through the openings 114, 144 and 164, once the door 122 is sufficiently opened.

The base 112 is shown as including four fastener holes 120, which can be counter bore holes, but are not limited thereto. The fastener holes 120 enable the base 112 to be mounted to the tabletop 142 of the table 140 using fasteners 121, which can be screws or bolts, but are not limited thereto. The fasteners 121 may be screwed directly into the tabletop 142 (which may or may not already include pilot holes, not shown), or bolted to the tabletop 142 through holes (not shown) in the tabletop 142.

The door 122 is shown as being generally rectangular and having a proximal end 124 and an opposing distal end 126 at which is located a handle 128. In the embodiment shown, the handle 128 is meant to be gripped by a user's (e.g., dealer's) fingers to slide the door generally parallel to the tabletop 142 from its closed position to its open position. The door 122 slides within a slot 113 in the base 112. The wall 117 of the base 112 keeps the tokens 103 in place over the opening 114 in the base 112, so that once the proximal end 124 of the door 122 slides past a substantial portion of (e.g., at least 50% of) the opening 114 the tokens drop through the opening 114 in the base 112 into the drop box 162 that is positioned below the drop slide 102 and the tabletop 142. The proximal end 124 of the door 122 can also referred to herein as the leading end 124 or the leading edge 124 of the door 122. It is noted that the tokens 103 will likely begin to drop through the opening 114 in the drop slide 102 when the leading edge 124 of the door 122 is extending across the center of the opening 114, i.e., when the door 122 has been slid past about 50% of the opening 114. According, where the goal is to capture an image of the tokens 103 before they begin to drop through the opening 114, the camera trigger 134 should preferably be positioned and configured to trigger the camera 132 before the leading edge 124 of the door 122 extends across the center of the opening 114, i.e., before the door 122 has been slid past about 50% of the opening 114. In certain embodiments, the door 122 is spring loaded such that after a user (e.g., dealer) uses the handle 128 to slide the door 122 from its closed position to its open position, one or more springs (not shown) automatically move the door 122 back to its closed position when the dealer releases the handle 128. Alternatively, if the door 122 is not spring loaded, the user can use the handle to move the door 122 back to its closed position.

In FIG. 1 (and FIGS. 4A and 4B) the door 122 is shown as being partially slid open, such that a portion of the opening 114 in the base 112 of the drop slide 102 (or 302) is visible. When the door 122 is in its closed position, the opening 114 in the base 112 is completely covered by the door and the opening 114 in the base 112 of the drop slide 102 (or 402) would not be visible. When the door 122 is in its open position (which can also be referred to as the or its opened position), the opening 114 in the base 112 would not be covered by the door 122, and tokens that had been resting on the door 122 would fall through the opening 114 in the base 112 due to gravity. As noted above, the wall 117 of the base 112 act as a stop for the tokens 103, so that the tokens 103 do not slide along with the door 122 as the door is slid from its closed position to its open position.

As noted above, conventionally, the total value of all the tokens that are dropped via the drop slide 102 into the drop box 162 is unknown until the contents of the drop box 162 are emptied and manually counted by a casino employee. It is possible that a casino employee that is tasked with removing tokens from the drop box 162 and/or tallying the value of the tokens slips some in their pocket or otherwise skims some of the tokens. Embodiments of the present technology described herein can be used to mitigate and preferably overcome these problems, by automatically determining the total value and number of tokens that are dropped into the drop box 162, as will be described below. Certain embodiments of the present technology allow a casino to track dealer performance in real time, in a more meaningful way than has previously been possible. Previously developed technology exists that can simply track the number hands dealt and the intervals between hands, but not the amount of fees that are collected per hand. In many cases, the amount of fees that are collected for any given hand directly relates to the effort that a dealer puts into dealing the hand. For example, if a dealer collects a large amount of fees for a given hand, that hand must have had a large number of bets made, and therefore would have taken a greater effort to settle the bets than a hand where little fees were collected, little wagered, and therefore little effort expended settling those bets completing the hand. This real time information allows a casino to distinguish between dealers that are the most profitable and dealers that simply dealt the most hands.

The drop box 162 could be held and locked in place under the table 140 by a sleeve (not shown) that can be bolted to an underside of the table 140. Such a sleeve can include a locking mechanism that enables the drop box 162 to be secured in place and removed (when it is time to remove the drop box 162 and thereafter access the tokens within the drop box 162) and replaced with another (e.g., empty) drop box. In FIG. 1 the auxiliary unit 152 is shown as being located between the drop box 162 and an underside of the table 140. In such an embodiment, the auxiliary unit 152 may be bolted or otherwise mounted between the table 140 and the sleeve (not shown) that holds and locks the drop box 162 in place. In FIG. 1, the auxiliary unit 152 is shown as including an opening 154 (that aligns with the openings 114, 144 and 164 in the drop slide 102, the tabletop 142 and the drop box 162, respectively) that allows tokens 103 to drop there-through. In alternative embodiments, the auxiliary unit 152 can be mounted to a portion of the underside of the table 140 that is not below the drop slide 102 or above the drop box 162. It would also be possible the mount the auxiliary unit 152 to a side of the sleeve that holds the drop box 162, or to the floor below the table 140, or in some other location on, below or near the table 140. The auxiliary unit 152, as will be described below with reference to FIG. 2, can include electronics associated with the camera 132 and/or the camera trigger 134, and can also include memory to store images captured by the camera 132. The auxiliary unit 152 can also include or provide communication capabilities that enable stored images, and the like, to be transferred to the computer 172. The auxiliary unit 152 can have a different form factor than shown in FIG. 1, and may be made much smaller than shown. The auxiliary unit 152 can be in communication with the user interface 182 and/or the computer 172. It would also be possible to incorporate the user interface 182 into the auxiliary unit 152, such that the capabilities of the user interface 182 are provided by the auxiliary unit 152. It may also be possible to eliminate the auxiliary unit altogether, in which case capabilities of the auxiliary unit can be performed by the computer 172.

Still referring to FIG. 1, the system 100, as noted above, is also shown as including the camera 132 and the camera trigger 134. The camera trigger 134 selectively triggers the camera 132 to capture an image (e.g., a digital image) of tokens (e.g., 103) that are resting on an upper surface of the door 122 before the door is sufficiently opened such that the tokens that were resting on the door fall through the opening 114 in the base 112 of the drop slot 102 and into the drop box 162. In the embodiment shown in FIG. 1, the camera 132 is shown as being located in a cavity or recess in the wall 117 that extends vertically between the upper surface of the recessed portion 116 and the upper surface of the raised portion 118 of the base 102. The camera 132 can be located at various other locations, so long as the camera 132 is positioned such that any stack of tokens up to some maximum number of tokens (e.g., 10 tokens, but not limited thereto) that are resting on an upper surface of the door 122 are within the field of view (FOV) of the camera 132 and will be included in an image captured by the camera 132. The camera 132 is preferably positioned such that it does not get in the way of a dealer sliding, slapping and/or otherwise maneuvering tokens 103 onto door 122 of the drop slide 102. In accordance with certain embodiments of the present technology, the images of tokens should include side views of the edges of the tokens, so that an edge of each token within a stack of tokens is included in each image.

The camera 132 can include an image sensor, such as charge coupled device (CCD) sensor, a complementary metal-oxide-semiconductor (CMOS) sensor, an N-type metal-oxide-semiconductor (NMOS) sensor, or a scientific complementary metal-oxide-semiconductor (sCMOS) sensor, but is not limited thereto. The image sensor can be used to capture digital images of tokens resting on an upper surface of the door 122 (before the door is sufficiently opened such that the tokens that were resting on the door fall through the opening 114 in the base 112 of the drop slot 102 and into the drop box 162). More specifically, the image sensor can convert an optical image to an electronic signal that includes the digital image. The camera 132 can also include one or more lenses, which can be used to specify a field of view (FOV), focal length and aperture of the camera 132. The camera 132 can optionally also include a flash to provide extra light in dim, low light environments.

In FIG. 1, the camera trigger 134 is shown as being located within a cavity in the base 112 of the drop slide 102. The camera trigger 134 can alternatively be located at various other locations, some of which will be described in additional detail below. In accordance with certain embodiments, the camera trigger 134 is configured to detect when the door 122 is being moved from its closed position to its open position so that the camera trigger 134 can trigger the camera 132 to capture an image of tokens resting on an upper surface of the door 122 (before the door is sufficiently opened such that the tokens that were resting on the door fall through the opening 114 in the base 112 of the drop slot 102 and into the drop box 162).

In accordance with an embodiment, the camera trigger 134 is implemented as an optical proximity sensor that includes an infrared (IR) light emitting element (e.g., a light emitting diode, or a laser diode) and an adjacent light detector (e.g., a photodetector or photodiode), which may be optically isolated from one another by an opaque barrier. The light emitting element emits IR light which reflects off a lower surface or the leading edge 124 of the door 122 (when the door 122 is closed) and is detected by the light detector and converted into an electrical detection signal. A magnitude of the electrical detection signal will exceed a threshold when the door 122 is closed, and will fall below the threshold when the door 122 no longer covers the optical proximity sensor, because the IR light will no longer be reflected off the lower surface of the door 122. In this manner, the optical proximity sensor can trigger the camera 132 to capture an image of tokens when the door is being moved from its closed position to its open position.

In accordance with another embodiment, the camera trigger 134 is implemented as an ambient light sensor (ALS) that includes a light detector (e.g., a photodetector or photodiode) that converts ambient light that in incident on the ALS to an electrical light detection signal. A magnitude of the light detection signal will be below a threshold when a portion of the door 122 (e.g., a bottom surface or the leading edge 124 of the door 122) covers the ALS, during which time substantially no ambient light is incident on the ALS. When a portion of the door 122 no longer covers the ALS, ambient light (e.g., emitted by light fixtures within a casino) will be incident on the ALS and a magnitude of the light detection signal produced by the ALS will exceed the threshold. In this manner, the ALS can be used to trigger the camera 132 to capture an image of the tokens when the door is being moved from its closed position to its open position.

The camera trigger 134 can alternatively be implemented using other types of sensors that can detect when the door 122 transitions from covering or otherwise blocking the sensor to no longer covering or otherwise blocking the sensor, and thus, is in the process of being opened. For example, the camera trigger 134 can be implemented using a capacitive sensor, or a magnetic sensor, but are not limited thereto. It is also possible that a sensor be positioned and configured to detect when the door 122 transitions from not covering or otherwise blocking the sensor to covering or otherwise blocking the sensor, and thus, is in the process of being opened. In other words, it can be that a sensor type camera trigger 134 is not covered or otherwise blocked when the door 122 is in its closed position, and the sensor type camera trigger 134 becomes covered or otherwise blocked when the door 122 is moved from its closed position to its open position.

In FIG. 1, the camera trigger 134 is shown as being located at a specific location within the recessed portion 116 of the base 112 and being directed upward in a direction of where the door 122 is located when the door is closed. The camera trigger 134 can alternatively be located at other locations within the recessed portion 116 of the base 112. It is also possible that the camera trigger be located at other locations, such as at a location within the vertical wall 117, e.g., below or to the side of the camera 132, but is not limited thereto.

Instead of implementing the camera trigger 134 using a sensor that detects when the door 122 transitions from covering or otherwise blocking the sensor to no longer covering or otherwise blocking the sensor, or vice versa, the camera trigger 134 can alternatively be implemented using a switch that is unactuated when the door is in the closed position and is actuated in response to the door being moved from the closed position to the open position. Such a switch can be mechanically activated and/or electrically activated in response to the door 122 being moved from the closed position to the open position. In other words the switch type camera trigger 134 can be mechanical switch and/or an electrical switch, e.g., an electromechanical switch. The switch type of camera trigger 134 can be located within the recessed portion 116 of the base 112, e.g., at the position shown in FIG. 1, or at other locations within the recessed portion 116. It is also possible that a switch type camera trigger be located at other locations, such as at a location within the wall 117, e.g., below or to the side of the camera 132. In certain embodiments, the switch type camera trigger 134 includes a ball or a roller that rests against a surface (e.g., a bottom or side surface) of the door 122 and is rotated when the door 122 is moved from its closed position to its open position, and the switch is actuated mechanically and/or electrically in response to being rotated. These are just a few examples of the types of switches that can be used to implement a switch type camera trigger 134 and are not meant to be all encompassing, as one of ordinary skill in the art reading this description would appreciate that the use of alternative types of switches are within the scope of the embodiments described herein.

In FIG. 1, a vertical wall 129 of the handle 128 of the door 122 is flush with a vertical wall 115 at the rear of the base 112 when the door 122 is closed. In certain embodiments, the camera trigger 134 can be located within the vertical wall 115 at the rear of the base 112. The camera trigger 134 within the vertical wall 115 can be a sensor that detects when the vertical wall 129 of the handle 128 of the door 122 is flush with the vertical wall 115 at the rear of the base 112, which is indicative of the door being closed, and detects when the vertical wall 129 of the handle 128 of the door 122 moves away from the vertical wall 115 at the rear of the base 112, which is indicative of the door 122 being moved from its closed position to its open position. Where the camera trigger 134 is implemented as a sensor within the vertical wall 115, the sensor can be, e.g., an optical proximity sensor, an ALS, a capacitive sensor or a magnetic sensor, but is not limited thereto. Instead of implementing the camera trigger 134 using a sensor that detects when the vertical wall 129 of the handle 128 of the door 122 moves away from the vertical wall 115 at the rear of the base 112, the camera trigger 134 can alternatively be implemented using a switch that is unactuated when the vertical wall 129 of the handle 128 of the door 122 is flush with the vertical wall 115 at the rear of the base 112, which is indicative of the door being closed, and is actuated when the vertical wall 129 of the handle 128 of the door 122 moves away from the vertical wall 115 at the rear of the base 112, which is indicative of the door 122 being moved from its closed position to its open position. A sensor or switch type camera trigger 134 can alternatively be located within the slot 113, or at any one of various other locations that enable the sensor or switch type camera trigger to detect when the door 122 is being moved from its closed position to its open position so that the camera trigger 134 can trigger the camera 132 to capture an image of tokens resting on the door 122, before the tokens drop into the drop box 162.

In accordance with certain embodiments, rather than a user (e.g., dealer) using the handle 128 to open the door 122, the door 122 can be coupled to an electromechanical solenoid (not shown) or other type of electromechnical actuator that is configured to electromechanically open the door 122 in response to the user (e.g., dealer) pressing a button (not shown) that is located on or near the drop slide 102. In such a case, the same button that is used to cause the door 122 to move from its closed position to its open position can also be used as the camera trigger 134, or one of the other types of camera triggers described above can be used.

In certain embodiments, the system 100 includes a user interface 182 (e.g., a keypad, card reader, fingerprint reader, fob reader, facial recognition reader, or the like), which is configured to enable various dealers that deal at the table 140 to identify themselves, so that the system 100 can keep track of the dealers, and can attribute to each of the dealers a subtotal of the total value of the tokens dropped into the drop box 162 by the dealer, as well as how many token drops are attributed to each dealer and the intervals between those drops. This can enable, for example, the system to track how many hands or games each of the dealers complete during a specified period of time, e.g., per hour, and thus a pace associated with each dealer as well as the fees collected by each dealer. The user interface 182 can be part of the computer 172 and/or in communication with the computer 172. Alternatively, the user interface 182 can be part of the auxiliary unit 152 and/or in communication with the auxiliary unit 152. The computer 172 can be located below the table 140, remote from the table 140 but within the casino that includes the table 140, or can be remote from the casino including the table 140, but is not limited thereto. The user interface 182 is preferably located on or close to the table 140, to easily enable dealers to use the user interface 182 to check in and check out at tables and identify themselves.

Alternatively, dealers can be entered into a system (e.g., the system 100) directly when rotation of the dealers from table to table is entered, which may eliminate the need for the dealers to check-in, check-out, or do anything else at the table to indicate that they were there. In certain embodiments, a dealer or pit boss can use the system 100 to drop a special token into a drop box, and an image of the special token can be obtained and analyzed to recognize the special token and thereby determine when a new dealer has moved to a table 140. The special token may not be unique to any specific dealer, in which case the special token can be used to identify a change of one dealer to another dealer. Alternatively, different special tokens can be associated with different dealers, so that images of the special tokens can be analyzed to identify which specific dealer just moved to and started dealing at a table (e.g., 140). Such special token(s) could have color(s) and/or edge pattern(s) that differ from the tokens 103 that represent monetary denominations. In still other embodiments, a dealer change button (not shown) can be located on or near the drop slide 102, the auxiliary unit 152, or a substrate (e.g., 401a or 401b described below with reference to FIGS. 4A and 4B), which button can be pressed by a dealer leaving a table or arriving at a table to specify to the auxiliary unit 152 and/or the computer 172 that there has been a dealer change. The dealer change button can alternatively be pressed by a pit boss or some other casino employee.

Figure 2:
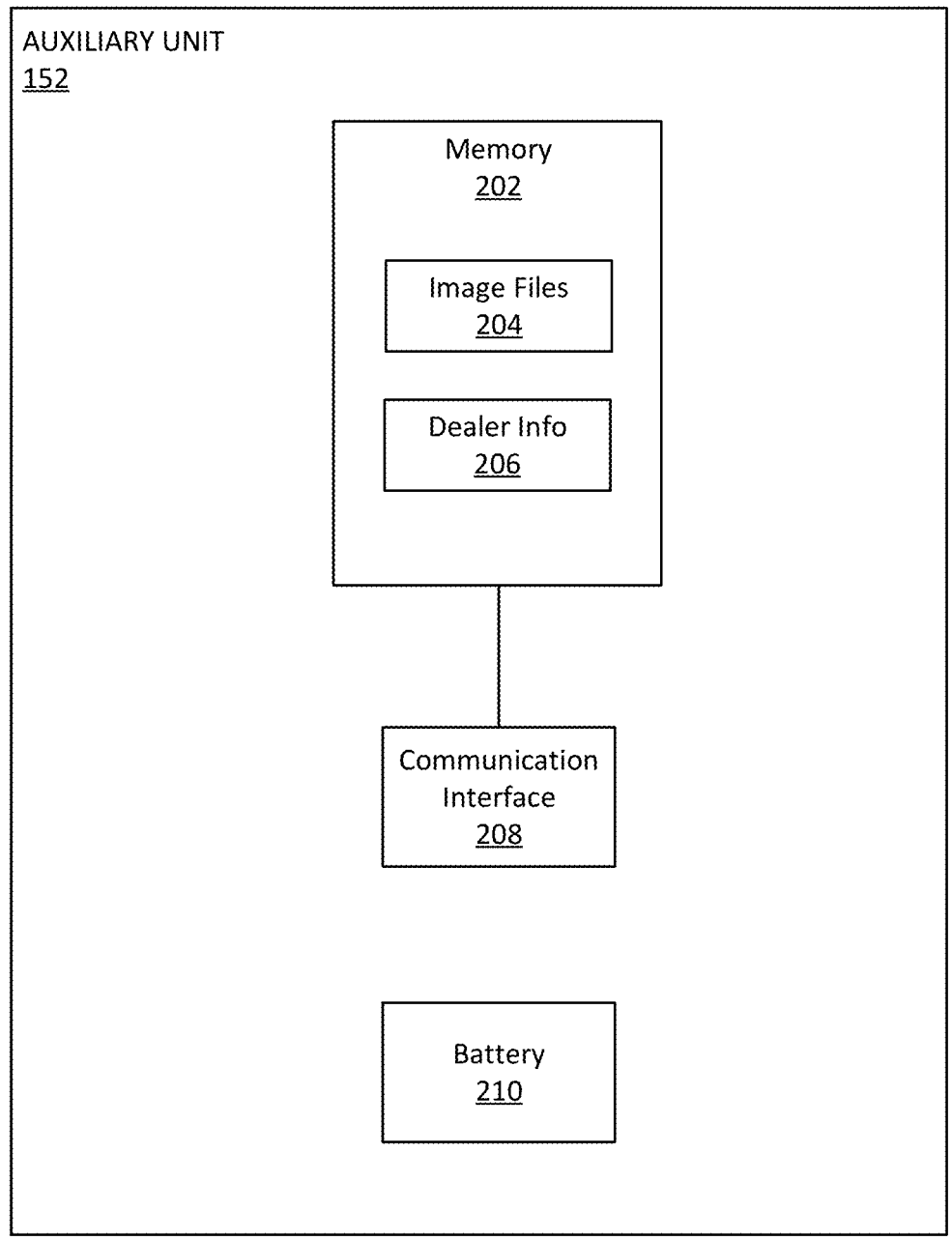
FIG. 2 illustrates exemplary details of the auxiliary unit of the system introduced in FIG. 1.

FIG. 2 is a block diagram illustrating exemplary details of the auxiliary unit 152. Referring to FIG. 2, the auxiliary unit 152 is shown as including memory 202, a communication interface 208 and a battery 210. The auxiliary unit 152 can additionally include electronics associated with the camera 132 and/or the camera trigger 134. The memory 202 is shown as storing image files 204, and more generally image data, which can be formatted in any one of various known or future image data formats, including, but not limited to: JPEG (Joint Photographic Experts Group), GIF (Graphics Interchange Format), TIFF (Tagged Image File Format), EXIF (Exchangeable Image File), BMP (Windows bitmap), PNG (Portable Network Graphics), just to name a few. Each image that is stored preferably includes a time stamp indicating the date and time (e.g., down to the second) when the image was captured, a table identifier that specifies that table at which the image was captured, and may also include additional information. The memory 202 is also shown as storing dealer information 206, which can be obtained when dealers identify themselves using the user interface 182, or press a dealer change button, or the like. Various different types of memory, including non-volatile and volatile memory can be included in the auxiliary unit 152. For example, the memory 202 can include high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. In certain embodiments the memory 202, or at least a portion thereof, is implemented as a thumb drive, memory stick, or other type of removable memory unit that can be selectively removed from the auxiliary unit 152 and inserted into a USB or other type of port on the computer 172 to transfer image data and other data from the auxiliary unit 152 to the computer 172. Contents of the memory 202 may alternatively be transferred to the computer 172 or some other network or computer using the communication interface 208, which can be a wired and/or wireless (e.g., WiFi) communication interface. The battery 210 can provide primary or backup power to the auxiliary unit 152 and the components thereof. Additional or alternative types of power supplies can be used to power components of the auxiliary unit.

Figure 3:
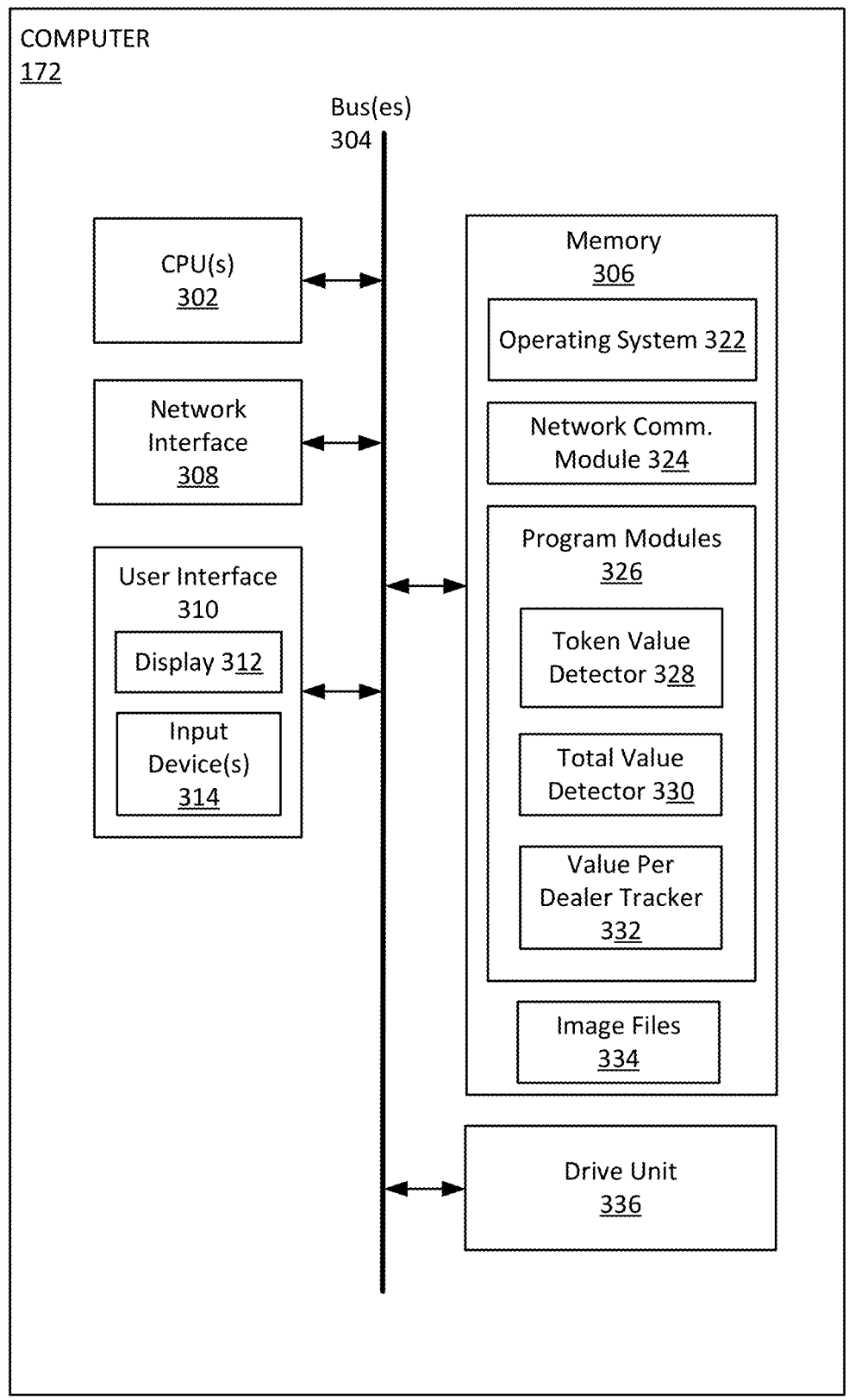
FIG. 3 illustrates exemplary details of the computer of the system introduced in FIG. 1.

FIG. 3 is a block diagram illustrating exemplary details of the computer 172 of the system 100 introduced in FIG. 1. Referring to FIG. 3, the computer 172 is shown as including one or more processors (e.g., CPU's) 302, one or more network or other communications interfaces 308, a user interface 310, a memory 306, a drive unit 336, and one or more communication buses 304 for interconnecting these and other components. The communication buses 304 optionally include circuitry (sometimes called a chipset) that interconnects and controls communications between system components. The user interface 310 includes a display device 312 and one or more input devices 314.

In some implementations, the display device 312 is integrated with the device (e.g., housed in the same chassis as the CPU and memory, such as with a laptop or a tablet computer). In some other implementations, the display device 312 is separate from other components of the computer 172 (e.g., a separate device from the device that houses the CPUs 3302 and memory 306, such as with a desktop computer with a "tower" chassis housing the CPU and memory and a separate display device).

In some implementations, the input device(s) 314 include one or more of: a mouse or similar pointing device, a keypad, a keyboard, a card reader, a touch-sensitive surface (e.g., a touch pad, a touch-sensitive display), a joystick, and one or more buttons. In some implementations, the display device 312 is a touch screen (i.e., a touch-sensitive display) that, as described below, may display a virtual keyboard. The user interface 182 (e.g., a keypad, card or fob reader, fingerprint reader, facial recognition reader, or the like), discussed above with reference to FIG. 1, can be an input device 314 of the computer 172. In some implementations, the computer 172 includes additional input devices, such as an audio input device (e.g., a microphone). In some implementations, the computer 172 includes an audio output device (e.g., a speaker, headphones).

The memory 306 can be used to store software and/or firmware that controls the computer 172, as well to store machine readable executable code for various program modules 326, such as a token value detector module 328, a total value detector module 330, and a value per dealer tracker module 332. Further, the memory 306 can also store images that are captured by the camera 132, but is not limited thereto. Such images can be stored as image files, as indicated by block 334. The image files, and more generally image data, can be formatted in any one of various known or future image data formats, including, but not limited to: JPEG (Joint Photographic Experts Group), GIF (Graphics Interchange Format), TIFF (Tagged Image File Format), EXIF (Exchangeable Image File), BMP (Windows bitmap), PNG (Portable Network Graphics), just to name a few. Various different types of memory, including non-volatile and volatile memory can be included in the computer 172. For example, the memory 306 can include high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 306 may optionally include one or more storage devices remotely located from the CPU(s) 3302. The memory 306, or alternatively the non-volatile memory device(s) within memory 306, comprises a non-transitory computer readable storage medium. In some implementations, the memory 306 or the computer readable storage medium of memory 306 store the following programs, modules and data structures, or a subset thereof, including: an operating system 3322, network communication module 324, and program modules 326.

A drive unit 336, e.g., a hard drive, but not limited thereto, can also be used to store software that controls the computer 172, as well to store images captured using the camera 132, but is not limited thereto. The memory 306 and the drive unit 336 can include a machine readable medium on which is stored one or more sets of executable instructions (e.g., programs or applications) embodying one or more of the methodologies and/or functions described herein. In place of the drive unit 336, or in addition to the drive unit, the computer 172 can include a solid-state storage device, such as those comprising flash memory or any form of non-volatile memory. The terms "machine-readable medium" and "processor readable storage device" as used herein should be taken to include all forms of storage media, either as a single medium or multiple media, in all forms; e.g., a centralized or distributed database and/or associated caches and servers; one or more storage devices, such as storage drives (including e.g., magnetic and optical drives and storage mechanisms), and one or more instances of memory devices or modules (whether main memory, cache storage either internal or external to a processor, or buffers. The term "machine-readable medium," "computer-readable medium," and "processor readable storage device" shall be taken to include any tangible non-transitory medium which is capable of storing or encoding a sequence of instructions for execution by the machine and that cause the machine to perform any one of the methodologies. The term "non-transitory medium" expressly includes all forms of storage drives (optical, magnetic, etc.) and all forms of memory devices (e.g., DRAM, Flash (of all storage designs), SRAM, MRAM, phase change, etc., as well as all other structures designed to store information of any type for later retrieval.

The memory 306, the disk unit 336 and/or other types of storage media of the computer 172 can be referred more generally herein as a data store. Further, because such storage media is part of the computer 172, such storage media can be referred to as a local data store, so as to distinguish it from a remote data store associated a remote computer (e.g., a remote server).

The operating system 3322 includes procedures for handling various basic system services and for performing hardware dependent tasks.

The network communication module 324 facilitates communication with other devices and computers via the one or more communication network interfaces 308 (wired or wireless) and one or more communication networks, such as the Internet, other wide area networks, local area networks, metropolitan area networks, and so on.

The program modules 326 perform various operations. In some implementations, the program modules 326 include a token value detector module 328, a total value detector module 330, and a value per dealer tracker module 332. The token value detector module 328 analyzes images of tokens 103 resting on the door 122 that are captured by the camera 132 to determine a value of each of the tokens 103. In certain embodiments, the token value detector module 328 uses computer vision to analyze the images of the tokens resting on the door that are captured by the camera 132 to determine the value of each of the tokens. Such computer vision can be used to identify boundaries between adjacent tokens stacked one above the other in an image, identify the color and/or edge pattern (also known as edge spots or edge markings) of each of the tokens included in the image. The colors and/or edge patterns of the edge markings on a token can be encoded with information such as the issuing casino, the denomination (i.e., value) and/or a unique serial number. The edge markings can be visible to the human eye and/or may be printed using an ink that is not typically visible to humans, such as an ink that is only visible in the infrared (IR) portion of the electromagnetic spectrum. Where the tokens include edge markings that are not visible to humans, the camera 132 that takes images of the tokens should be configured to be able to capture images of such edge markings, such as IR markings, but not limited thereto. In certain embodiments, the token value detector module 328 is programmed to determine a value (e.g., denomination) of each token included in an image by comparing an image captured by the camera 132 to known images of tokens of various different values (e.g., denominations) that may be stored in the memory 306.

There is no universally standardized color and edge marking scheme for tokens and their corresponding values, and schemes may vary nationally and regionally, from venue (e.g., casino) to venue within a region, or by event type within a single venue (e.g., a single casino). Accordingly, the token value detector module 328 should be tailored to the specific venue, tokens and/or gaming table for which a system and/or method of the present technology is to be used. This can be performed by using appropriate programming and training (e.g., using machine learning) of the system.

The total value detector module 330 can calculate a total value of the tokens that are dropped into the drop box 162 by tracking a running total of the values of the tokens dropped into the drop box 162 over time. The total value calculated by the total value detector module 330 can be reset each time the drop box 162 is removed from below the table 140. Prior to such a reset, a total value can be stored with a time stamp and/or associated with a unique identifier for the particular drop box 162.

The value per dealer tracker module 332 can keep track of multiple dealers that deal at the table 140 and attribute to each of the dealers a subtotal of the total value of the tokens dropped into the drop box 162 by the dealer. The value per dealer tracker module 332 can identify dealers based on inputs from the dealers accepted using the user interface 182. This may alternatively be done using another subsystem that accepts this information into the system for an entire gaming room or casino at a central location. For example, dealers may be kept track of on a "rotation board." It would also be possible to manually keep track of which dealers are at which tables, but it would be preferable to keep track of this electronically. A table or matrix can have all dealers' names written next to rows and times (one column for each half hour) on the columns. Under each half hour represented by a cell in the table, the table number at which a dealer was dealing during the half hour can be entered. This information can be entered directly into the computer 172, or manually kept track of and thereafter entered into the computer by someone who is recording the rotation of the dealers (e.g., rotating from table to table every half hour). Preferably something or someone tells the auxiliary unit 152 that there has been a dealer change at the instant that happens—dealer exchanges (rotation) usually occurs on the half hour but it can be delayed by quite a bit or there could even be an extra dealer change if there were an emergency or the like. The auxiliary unit 152 is preferably able to store the images of tokens and other information for quite a while in case a communication connection (e.g., a WiFi connection) fails or the computer 172 fails.

Each of the above identified program modules may be stored in one or more of the previously mentioned memory devices, and each of the modules or programs corresponds to a set of instructions for performing a function described above. The set of instructions can be executed by one or more processors (e.g., the CPUs 3302). The above identified modules or programs (i.e., sets of instructions) need not be implemented as separate software programs, procedures or modules, and thus various subsets of these modules may be combined or otherwise rearranged in various implementations. In some implementations, the memory 306 may store a subset of the modules and data structures identified above. Furthermore, the memory 306 may store additional modules and data structures not described above.

The total value calculated by the total value detector module 330, and the value per dealer determined by the value per dealer tracker module 332, can be saved in the memory 306, displayed via a display 312 of the computer 172, printed out, emailed or otherwise electronically transferred to other computers and/or otherwise saved, displayed, distributed and/or shared.

In the system 100 initially described with reference to FIG. 1, the camera 132 and the camera trigger 134 were shown as being located on portions of the drop slide 102. The drop slide 102 can be manufactured to include the camera 132 and the camera trigger 134. Alternatively, the camera 132 and camera trigger 134 can be added to an existing (e.g., off the shelf, or already used) drop slide. In other words, a drop slide can be modified to include a camera 132 and a camera trigger 134. In alternative embodiments, initially described with reference to FIG. 4A, a system can include a substrate configured to be mounted to a table (e.g., below or above a drop slot), wherein at least one of the camera or the camera trigger is attached to and/or integrated into the substrate. In certain embodiments, the substrate can be a bracket configured to be mounted to the table such that at least a portion of the bracket is positioned below (or above) at least a portion of the drop slide, wherein at least one of the camera or the camera trigger is attached to and/or integrated into the bracket.

Figure 4A:
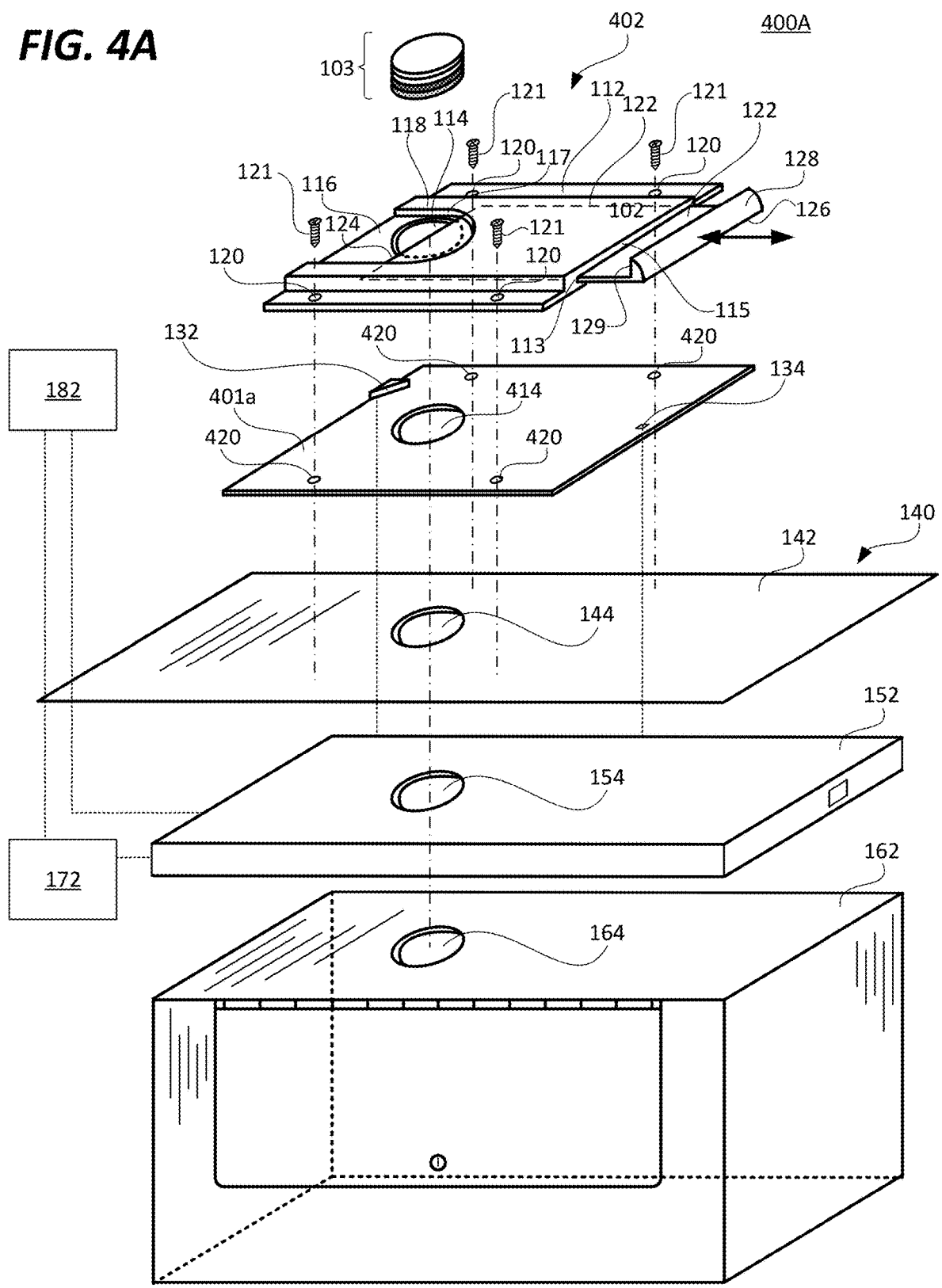

FIGS. 4A and 4B illustrate systems 400A and 400B according to alternative embodiments of the present technology. The systems 400A and 400B are shown as including a drop slide 402, a camera 132 and a camera trigger 134, and an auxiliary unit 152. The drop slide 402 is substantially the same as the drop slide 102 described above with reference to FIG. 1, but the drop slide 402 does not have the camera 132 and the camera trigger 134 attached to the drop slide 402. Rather, in FIGS. 4A and 4B, the camera 132 and the camera trigger 134 are attached to a substrate 401a or 401b. In each of FIGS. 4A and 4B the substrate 401a or 401b is a bracket, and thus the substrates 401a and 401b can also be referred to as a bracket 401. In FIGS. 4A and 4B, reference numbers that are the same as they were in FIG. 1 are essentially the same, and thus, need not be described again. Further, in FIGS. 4A and 4B, the computer 172 and the user interface 182 are shown, and the systems 400A and 400B can also include the computer 172 and/or the user interface 182, which can include the same components and function in the same manners as were described above with reference to FIGS. 1 and 3. FIG. 4A shows the bracket 401a with a portion thereof slid or otherwise positioned under the drop slide 402, and FIG. 4B shows the bracket 401a positioned above a portion of the drop slide 402. In both embodiments, the brackets can be attached to the table 140 using at least one, and preferably at least two (or more), of the same fasteners 121 that are used to mount the drop slide 402 to the table 140. It would also be possible, and within the scope of the embodiment of the present technology, that the camera 132 and/or camera trigger 134 be attached to and/or integrated into a substrate that is configured to be mounted adjacent to a drop slide, without any portion of the substrate being mounted under or above a portion of the drop slide.

Referring to FIG. 4A, the bracket 401a is shown as being generally rectangular with a slightly longer length (and thus, footprint) than the drop slide 402. The bracket 401a is also shown as including a camera 132, a camera trigger 134, an opening 414 and fastener holes 420. The opening 414, which aligns with the openings 114, 144 and 164 in the drop slide 402, the tabletop 142 and the drop box 162, respectively, allows tokens 103 to drop there-through. The fastener holes 420 enable the same fasteners 121 that are used to mount the drop slide 402 to the table 140 to also mount the bracket 401a between the drop slide 402 and the table 140. Once a portion of the bracket 401a is mounted under a portion of the drop slide 402, the camera 132 will be appropriately positioned such that any stack of tokens 103 up to some maximum number of tokens (e.g., 10 tokens, but not limited thereto) that are resting on an upper surface of the door 122 are within the field of view (FOV) of the camera 132 and will be included in an image captured by the camera 132. Also, once a portion of the bracket 401a is mounted under a portion of the drop slide 402, the camera trigger 134 will be appropriately positioned to detect when the door 122 is being moved from its closed positioned to its open position, and thus, when the tokens 103 are about to drop through the various openings into the drop box 162.

Referring to FIG. 4B, the bracket 401b is shown as being generally U-shaped or C-shaped and including a camera 132, a camera trigger 134, and fastener holes 420. The fastener holes 420 enable the same fasteners 121 that are used to mount the drop slide 402 to the table 140 to also mount the bracket 401b above a portion of the drop slide 402. Once a portion of the bracket 401b is mounted above a portion of the drop slide 402, the camera 132 will be appropriately positioned such that any stack of tokens 103 up to some maximum number of tokens (e.g., 10 tokens, but not limited thereto) that are resting on an upper surface of the door 122 are within the field of view (FOV) of the camera 132 and will be included in an image captured by the camera 132. Also, once a portion of the bracket 401b is mounted above a portion of the drop slide 402, the camera trigger 134 will be appropriately positioned to detect when the door 122 is being moved from its closed positioned to its open position, and thus, when the tokens 103 are about to drop through the various openings into the drop box 162.

The brackets 401a and 401b (or more generally, the substrates) can be made of various different materials including metals, alloys, plastics, wood, carbon fibers, and/or combinations thereof. The camera 132 and the camera trigger 134 can operate in essentially the same manners as were described above with reference to FIG. 1. More specifically, the camera 132 can be selectively triggered to capture an image of tokens resting on the door 122, before the tokens drop into the drop box 162, in response to the camera trigger 134 detecting that the door 122 is being moved from the closed position to the open position. A distinction between the embodiments described above with reference to FIG. 1, and the embodiments described with reference to FIGS. 4A and 4B, is that the embodiments described with reference to FIGS. 4A and 4B can be more easily added to a table that already has a drop slide mounted thereto. For example, the bracket 401a or 401b can be installed by temporarily removing (e.g., unscrewing and/or unbolting) the fasteners 121 used to mount the drop slide 402 to the tabletop 142, and then sliding a portion of the bracket 401a under a portion of the drop slide 402, or placing the bracket 401b above a portion of the drop slide 402, so that the fastening holes 420 in the bracket 401a or 401b line up with the fastening holes 120 in the drop slide 402. The same fasteners 121, or replacement fasteners, can then be used to mount both the bracket 401a (or 401b) and the drop slide 402 to the table 140, and more specifically the tabletop 142 thereof.

The camera 132 can be located at some other locations of the brackets than shown in FIGS. 4A and 4B, so long as the camera 132 is positioned such that any stack of tokens up to some maximum number of tokens (e.g., 10 tokens, but not limited thereto) that are resting on an upper surface of the door 122 are within the field of view (FOV) of the camera 132 and will be included in an image captured by the camera 132. The camera trigger 134 can be located at some other locations of the brackets than the location shown in FIGS. 4A and 4B, so long as the camera trigger 134 can be used to detect when the door 122 of the drop slide 402 is being moved from its closed position to its open position, such that the camera trigger 134 can trigger the camera 132 to capture an image of tokens resting on the door 122, before the tokens drop into the drop box 162. The camera trigger 134 can be implemented, e.g., as an optical proximity sensor, an ambient light sensor, a capacitive sensor, or a magnetic sensor. The camera trigger 134 can alternatively be implemented as a switch that is unactuated when the door is in the closed position and is actuated in response to the door being moved from the closed position to the open position. Such a switch can be either mechanically activated or electrically activated in response to the door 122 being moved from the closed position to the open position.

It is also possible that one of the camera 132 or the camera trigger 134 be located on a bracket (e.g., 401a or 401b), and the other be located on the drop slide 402. The brackets 401a and 401b can have alternative form factors than the form factors shown and described with reference to FIGS. 4A and 4B.

In the embodiments described above, a camera (e.g., 132) was described as being used to selectively capture an image of tokens resting on a door (e.g., 122), before the tokens drop into a drop box (e.g., 162), in response to a camera trigger (e.g., 134) detecting that the door is being moved from a closed position to an open position. It is also within the scope of the embodiments described herein that a system includes more than one camera so that multiple cameras can be used at the same time to capture multiple images of the same tokens (each from a different view point), in which case multiple images can be available to the total value detector module 330 to analyze and determine the value of the tokens included in the images. Where a system described herein is to be used in a venue that uses tokens that have RFID tags, it is possible that an RFID reader can be used in place of or in addition to the camera 132. However, a benefit of the embodiments described above is that they do not require the use of any special types of tokens, such as tokens that include RFID tags.

In the above description, the drop slides 102 and 402 were described as including a door that is slid between its closed and opened positions. It would also be possible that embodiments of the present technology be used with alternative types of devices or apparatuses that are used to selectively cause tokens, that are resting on a door, to be dropped into a drop box by moving the door from a closed position to an open position. For example, instead of the door sliding, the door may instead pivot or rotate by pushing down on a portion of the door, pushing down on the tokens resting on the door, or pulling up on a portion or handle of the door. With such an apparatus, a camera trigger (examples of which were described above) can still be used to trigger a camera to capture an image of tokens resting on a door or on another portion of the apparatus, before the tokens drop into the drop box, in response to the camera trigger detecting that the door is being moved from the closed position to the open position, or more generally, in response to a component of the apparatus about to cause the tokens to drop into the drop box.

The high level flow diagram of FIG. 4 will now be used to summarize methods according to various embodiments of the present technology. Such methods can be used with a gaming table including an opening below which is located a drop box, wherein the opening in the table is covered by a door when the door is in a closed position and at least a portion of the opening in the table is uncovered when the door is in an open position. The door can be part of a drop slide (e.g., 102 or 302), examples of which were described above.

Figure 5:
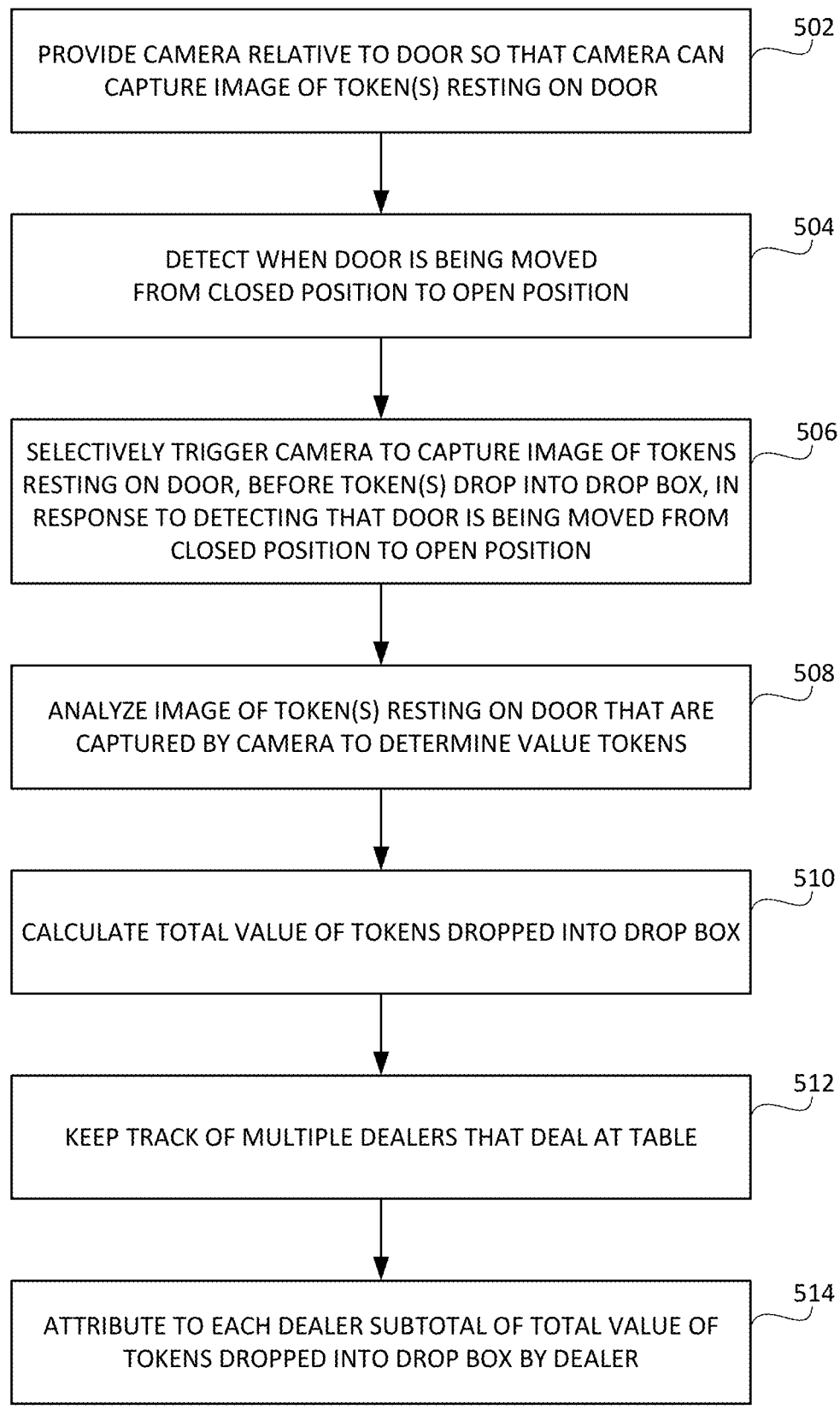
FIG. 5 is a high level flow diagram that is used to summarize methods according to various embodiments of the present technology.

Referring to FIG. 5, step 502 involves providing a camera relative to the door so that the camera can capture an image of tokens resting on the door. Step 504 involves detecting when the door is being moved from a closed position to an open position. In certain embodiments, step 504 is performed using a sensor, that is covered by the door when the door is in the closed position and is uncovered when the door is moved from the closed position to the open position. In such embodiments, step 504 can include determining whether or not the sensor is being covered or otherwise blocked by the door based on a signal produced by the sensor. In other embodiments, the sensor is never covered or otherwise blocked by the door, but can still detect when the door moves from close to the sensor to farther away from the sensor. In certain embodiments, step 504 is performed using a switch that is unactuated when the door is in the closed position and is actuated in response to the door being moved from the closed position to the open position. Other variations are also possible and within the scope of the embodiments described herein. Still referring to FIG. 5, step 506 involves selectively triggered the camera to capture an image of tokens resting on the door, before the tokens drop into the drop box, in response to detecting that the door is being moved from the closed position to the open position. Step 508 involves analyzing the image(s) of tokens resting on the door that are captured by the camera to determine a value of each of the tokens. Step 510 involves calculating a total value of the tokens that are dropped into the drop box. Such analyzing and the calculating at steps 508 and 510 can be performed using one or more processors. Still referring to FIG. 5, step 512 involves keeping track of multiple dealers that deal at the table, and step 514 involves attributing to each of the dealers a subtotal of the total value of the tokens dropped into the drop box by the dealer. Steps 512 and 514 can also be performed using one or more processors. In accordance with certain embodiments, step 512 includes identifying each of the dealers based on an identifier accepted by a key pad or read by a card or fob reader, or some other user interface. Additionally, or alternatively, facial and/or fingerprint recognition can be used. Additional details of these methods can be appreciated from the above discussion of FIGS. 1, 2, 3, 4A and 4B.

Beneficially, the systems and methods described herein can automatically determine the total value of the tokens dropped into a drop box without requiring that a dealer modify their behavior. For example, there is no requirement that the dealer must insert one token at a time into a slot, or the like. Additional benefits and advantages of the embodiments of the present technology can be appreciated from the above description.

Embodiments of the present technology have been described above with the aid of functional building blocks illustrating the performance of specified functions and relationships thereof. The boundaries of these functional building blocks have often been defined herein for the convenience of the description. Alternate boundaries can be defined so long as the specified functions and relationships thereof are appropriately performed. Any such alternate boundaries are thus within the scope and spirit of the claimed technology. For example, it would be possible to combine or separate some of the steps shown in FIG. 5 and/or change the order of some of the steps. For other examples, the drop slides, doors, substrates and other apparatuses described herein can have various different form factors than shown in and described with reference to the FIGS., while still being within the scope of the embodiments of the present technology.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claim is:

1. A system for use with a table having a tabletop including an opening below which is located a drop box, wherein the opening in the tabletop is covered by a door of a drop slide when the door of the drop slide is in a closed position and at least a portion of the opening in the tabletop is uncovered when the door of the drop slide is slid from the closed position to an open position, the system comprising:
  a camera located above and supported by the tabletop and positioned relative to the door of the drop slide so that the camera can capture an image of one or more tokens of a stack of tokens resting on the door of the drop slide, before the one or more tokens drop into the drop box responsive to the drop slide being slid from the closed position to the open position, such that the image captured by the camera includes a side view of an edge of the one or more tokens included in the image; and
  one or more processors configured to analyze one or more said images of one or more tokens resting on the door that are captured by the camera to determine a value of each of the one or more tokens included in the one or more said images based on side views of edges of the tokens included in the one or more said images;
  wherein the camera, which is located above and supported by the tabletop, is attached to and/or integrated into the drop slide, or is attached to and/or integrated into a substrate configured to be mounted above the tabletop such that at least a portion of the substrate is positioned below, above or adjacent to at least a portion of the drop slide.

2. The system of claim 1, further comprising:
a camera trigger configured to detect when the door of the drop slide is being moved from the closed position to the open position;
wherein the camera is selectively triggered to capture an image of one or more tokens resting on the door, before the one or more tokens drop into the drop box, in response to the camera trigger detecting that the door is being moved from the closed position to the open position; and
wherein the door of the drop slide is configured to be slid from the closed position to the open position in response to a translational force being applied to a handle of the door.

3. The system of claim 1, wherein the door is part of a drop slide with which the system can be used but which is separate from the system, wherein the system further comprises a substrate configured to be mounted to the table, and wherein the camera is attached to and/or integrated into the substrate.

4. The system of claim 3, wherein the substrate comprises a bracket configured to be mounted to the table such that at least a portion of the bracket is positioned below or above at least a portion of the drop slide, and wherein the camera is attached to and/or integrated into the bracket.

5. The system of claim 1, wherein the one or more processors is/are also configured to:
calculate a total value of the one or more tokens that are dropped into the drop box.

6. The system of claim 5, wherein the one or more processors is/are configured to use computer vision to analyze the one or more said images of the one or more tokens resting on the door that are captured by the camera to determine the value of each of the one or more tokens.

7. The system of claim 5, wherein the one or more processors is/are also configured to keep track of multiple dealers that deal at the table and attribute to each dealer of the multiple dealers a subtotal of the total value of the tokens dropped into the drop box by the dealer.

8. The system of claim 7, further comprising a user interface communicatively coupled to at least one of the one or more processors and configured to enable dealers to identify themselves and specify when they are dealing at the table.

9. The system of claim 2, wherein the camera trigger comprises a sensor configured to produce a signal that can be used to determine whether or not the sensor is being covered or otherwise blocked by the door, and wherein the sensor is selected from a group consisting of:
an optical proximity sensor;
an ambient light sensor;
a capacitive sensor; or
a magnetic sensor.

10. The system of claim 2, wherein the camera trigger comprises a switch that is unactuated when the door is in the closed position and is actuated in response to the door being moved from the closed position to the open position.

11. A method for use with a table having a tabletop including an opening below which is located a drop box, wherein the opening in the tabletop is covered by a door of a drop slide when the door is in a closed position and at least a portion of the opening in the tabletop is uncovered when the door of the drop slide is slid from the closed position to an open position, the method comprising:
providing a camera located above and supported by the tabletop and positioned relative to the door of the drop slide so that the camera can capture an image of one or more tokens of a stack of tokens resting on the door of the drop slide, before the one or more tokens drop into the drop box responsive to the drop slide being slid from the closed position to the open position, such that the image captured by the camera includes a side view of an edge of the one or more tokens included in the image; and
analyzing one or more said images of one or more tokens resting on the door that are captured by the camera to determine a value of each of the one or more tokens included in the one or more said images based on side views of edges of the tokens included in the one or more said images;
wherein the analyzing is performed using one or more processors.

12. The method of claim 11, further comprising:
calculating a total value of the one or more tokens that are dropped into the drop box;
wherein the calculating is also performed using one or more processors.

13. The method of claim 12, further comprising:
keeping track of multiple dealers that deal at the table; and
attributing to each dealer of the multiple dealers a subtotal of the total value of the tokens dropped into the drop box by the dealer.

14. The method of claim 13, wherein the keeping track of the multiple dealers that deal at the table includes identifying each dealer of the multiple dealers based on an identifier accepted by a user interface.

15. The method of claim 11, further comprising:
detecting when the door is being moved from the closed position to the open position; and
selectively triggered the camera to capture an image of one or more tokens resting on the door, before the one or more tokens drop into the drop box, in response to detecting that the door is being moved from the closed position to the open position;
wherein the detecting when the door is being moved from the closed position to the open position comprises:
using a sensor, that is covered by or otherwise blocked by the door when the door is in the closed position and is uncovered or otherwise unblocked when the door is moved from the closed position to the open position, to produce a signal; and
determining whether or not the sensor is being covered or otherwise blocked by the door based on the signal produced by the sensor.

16. The method of claim 11, further comprising:
detecting when the door is being moved from the closed position to the open position; and
selectively triggered the camera to capture an image of one or more tokens resting on the door, before the one or more tokens drop into the drop box, in response to detecting that the door is being moved from the closed position to the open position;
wherein the detecting when the door is being moved from the closed position to the open position is performed using a switch that is unactuated when the door is in the closed position and is actuated in response to the door being moved from the closed position to the open position.

17. A system for use with a table having a tabletop including an opening below which is located a drop box, wherein the opening in the tabletop is covered by an apparatus that can be used to selectively cause one or more tokens resting on a portion of the apparatus to drop through the opening in the tabletop and into the drop box, the system comprising:
- a camera located above and supported by the tabletop and positioned to capture an image of one or more tokens of a stack of tokens resting on a portion of the apparatus before the apparatus is used to drop the one or more tokens into the drop box, such that the image captured by the camera includes a side view of an edge of the one or more tokens included in the image;
- memory configured to store one or more said images captured by the camera; and
- one or more processors configured to analyze one or more said images of one or more tokens resting on a portion of the apparatus, which is/are captured by the camera and stored in the memory, to determine a value of each of the one or more tokens included in the one or more said images based on side views of edges of the tokens included in the one or more said images;
- wherein the camera, which is located above and supported by the tabletop, is attached to and/or integrated into the apparatus, or is attached to and/or integrated into a substrate configured to be mounted above the tabletop such that at least a portion of the substrate is positioned below, above or adjacent to the apparatus.

18. The system of claim 17, wherein the one or more processors is/are part of a computer and is/are also configured to:
- calculate a total value of the one or more tokens that are dropped into the drop box.

19. The system of claim 17, further comprising:
- a sensor configured to detect when the tokens are about to be dropped into the drop box by the apparatus;
- wherein the camera is selectively triggered to capture an image of the one or more tokens, before the one or more tokens drop into the drop box, in response to the sensor detecting that the apparatus is about to cause the one or more tokens to fall through the opening in the tabletop and into the drop box; and
- wherein the sensor is selected from a group consisting of:
  - an optical proximity sensor;
  - an ambient light sensor;
  - a capacitive sensor; or
  - a magnetic sensor.

20. The system of claim 17, further comprising:
- a switch configured to detect when the tokens are about to be dropped into the drop box by the apparatus;
- wherein the camera is selectively triggered to capture an image of the one or more tokens, before the one or more tokens drop into the drop box, in response to the switch detecting that the apparatus is about to cause the one or more tokens to fall through the opening in the tabletop and into the drop box; and
- wherein the switch is unactuated when a door of the apparatus is in the closed position and is actuated in response to the door of the apparatus being moved from the closed position to the open position.

21. A method for use with a table having a tabletop including an opening below which is located a drop box, wherein the opening in the tabletop is covered by an apparatus that can be used to selectively cause one or more tokens resting on a portion of the apparatus to drop through the opening in the tabletop and into the drop box, the method comprising:
- providing a camera located above and supported by the tabletop and positioned relative to the apparatus so that the camera can capture an image of one or more tokens of a stack of tokens resting on a portion of the apparatus before the apparatus is used to drop the one or more tokens into the drop box, such that the image captured by the camera includes a side view of an edge of the one or more tokens included in the image; and
- storing the image of the one or more tokens of a stack of tokens resting on the portion of the apparatus so that the image can be analyzed to determine a value of each of the one or more tokens included in the image and so that a total value of tokens that are dropped into the drop box can be determined based on the image and further images captured using the camera.

22. The method of claim 21, further comprising:
- analyzing the image that is stored to determine the value of each of the one or more tokens included in the image;
- wherein the analyzing is performed using one or more processors.

23. The method of claim 22, further comprising:
- determining the total value of tokens that are dropped into the drop box based on the image that is stored and further stored images captured using the camera;
- wherein the determining is performed using one or more processors.

* * * * *